(12) United States Patent
Hayashi

(10) Patent No.: US 7,783,136 B2
(45) Date of Patent: Aug. 24, 2010

(54) IMAGE DATA SEARCHING WITH CHANGING SEARCH METHOD BASED ON IMAGE DATA OUTPUT FORM

(75) Inventor: Tomonori Hayashi, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1076 days.

(21) Appl. No.: 11/457,354

(22) Filed: Jul. 13, 2006

(65) Prior Publication Data

US 2007/0013962 A1 Jan. 18, 2007

(30) Foreign Application Priority Data

Jul. 13, 2005 (JP) ............................. 2005-204874

(51) Int. Cl.
*G06K 9/00* (2006.01)
(52) U.S. Cl. ...................... 382/305; 358/403
(58) Field of Classification Search .................. 382/305
See application file for complete search history.

(56) References Cited

U.S. PATENT DOCUMENTS 5,991,466 A 11/1999 Ushiro et al.

2005/0254088 A1* 11/2005 Park et al. .................. 358/1.16
2006/0120627 A1* 6/2006 Shiiyama ..................... 382/305

FOREIGN PATENT DOCUMENTS

| JP | 5-35799 A | 2/1993 |
| JP | 6-268791 A | 9/1994 |
| JP | 7-212602 A | 8/1995 |
| JP | 2004-356964 A | 12/2004 |

\* cited by examiner

*Primary Examiner*—Brian P Werner
(74) *Attorney, Agent, or Firm*—Rossi, Kimms & McDowell LLP

(57) ABSTRACT

An image data search system capable of easily and surely detecting when, where, and how image data has been processed in an image forming apparatus capable of setting various output forms. A storage server stores image data involved in each job executed by a copying machine. A history management server records information including at least information indicating an output form of image data in the job as history information. A search server searches for image data matching desired image data from the image data stored in the storage server, and detects history information corresponding to the image data stored in the storage server, from the history information recorded in the history management server. Further the search server changes a search method based on the information indicating the output form, which is recorded in the detected history information.

12 Claims, 10 Drawing Sheets

IMAGE DATA SEARCHING WITH CHANGING SEARCH METHOD BASED ON IMAGE DATA OUTPUT FORM

BACKGROUND OF THE INVENTION

1. Field of the Invention

The present invention relates to an image data search system, image data search apparatus, and image data search method, a computer program for implementing the method, and a storage medium storing the computer program, and more particularly, to a use management function of an image data search system including a digital copying machine.

2. Description of the Related Art

With the wider use of digital copying machines, there has recently been provided, in addition to a digital copying machine having a simple function of copying originals, a digital copying machine having new functions as a general-purpose image processing apparatus, such as a facsimile/e-mail transmitting/receiving function and a function of forming an image from printing data received from a client PC.

In such a digital copying machine, input information to be processed is not limited to a paper original set on an original platen glass but ranges to image data transferred from other OA equipment, and the kind and contents of the information are also wide-ranging.

Under such circumstances, information leakage of confidential image data and the like due to the image forming or transmission thereof has become a significant problem. As a solution to such a problem, there has conventionally existed a copying machine that stores, in a memory device, all image data read at the time of copying, transmission, and the like of originals.

As such a conventional copying machine, there has been proposed a digital copying machine capable of not only performing normal copying processing but also displaying image data on a monitor (see, for example, Japanese Laid-open Patent Publication (Kokai) No. H06-268791). There has also been proposed a copying machine with a security function that compresses/converts image data into image data suitable for reduced printing and stores the resultant image data in a memory device (see, for example, Japanese Laid-open Patent Publication (Kokai) No. H07-212602).

In these conventional copying machines, by checking the stored image data, a manager can examine which copying machine read an original whose information has leaked out. This enables the manager to track when, where, and how the original was processed.

However, the conventional copying machines as described above store all the read image data in the memory device, resulting in an enormous volume of accumulated image data. Therefore, in a case where information leakage occurs, the manager has to check the image data one by one in order to track when, where, and how the leaked information was processed. This has been a time-consuming work.

In the conventional copying machines, by comparing text data generated by using OCR processing and data stored in a memory device, stored data that matches a leaked document can be detected from the memory device. However, in a case where leaked data is data such as a photo or a graphic image other than characters, the OCR processing is not usable. This forces the manager to visually check the stored image data one by one. Therefore, with the conventional copying machines, it has been difficult to detect desired data from the stored data.

Moreover, image arrangement of printed image data becomes different from that of original image data due to difference in output form, in a case where the digital copying machine prints the original image data with an image of an original being changed by performing, on the input image data, processing such as enlarged/reduced layout (processing for enlarging the input image data to output plural pages into which the enlarged image data is divided/processing for reducing the input image data to arrange plural pages of reduced input images in one page of an output image), printing-binding, or image shift. In such a case, it has been difficult to accurately detect image data matching the original image data based on the printed image data if only original image data or only printed image data are recorded.

SUMMARY OF THE INVENTION

It is an object of the present invention to provide an image data search system, image data search apparatus, and image data search method capable of easily and surely detecting when, where, and how image data has been processed in an image forming apparatus capable of setting various output forms, as well as a computer program for implementing the method and a storage medium storing the computer program.

To attain the above object, in a first aspect of the present invention, there is provided an image data search system comprising an image processing apparatus, an image data storage apparatus that stores image data involved in each job executed by the image processing apparatus, a history information recording apparatus that records information including at least information indicating an output form of image data in the job as history information, an image data search apparatus that searches for image data matching desired image data from the image data stored in the image data storage apparatus, and a history information detecting apparatus that detects history information corresponding to the image data stored in the image data storage apparatus, from the history information recorded in the history information recording apparatus, wherein the image data search apparatus changes a search method based on the information indicating the output form, which is recorded in the history information detected by the history information detecting apparatus.

Preferably, the image data search apparatus performs the search by changing areas of the image data stored in the image data storage apparatus, based on the information indicating the output form, which is recorded in the history information detected by the history information detecting apparatus.

Preferably, the image data search apparatus performs the search by changing areas of the desired image data, based on the information indicating the output form, which is recorded in the history information detected by the history information detecting apparatus.

Also preferably, the information indicating the output form is setting information of the image processing apparatus and includes at least one of enlargement/reduction setting information, finishing setting information, layout setting information, original color information, and printing color setting information.

Preferably, the image data search system further comprises an authentication apparatus that authenticates a user operating the image processing apparatus, and the history information recording apparatus records, as the history information, information on a user who instructs the execution of the job of the image processing apparatus, based on a result of the authentication by the authentication apparatus.

Preferably, the image processing apparatus includes an image reader, and the image data is image data of an original read by the image reader.

Preferably, the image processing apparatus includes an image reader and an image output device that outputs the image data based on the information indicating the output form, and the image data is one of image data of an original read by the image reader and the image data of the original outputted by the image output device.

Preferably, the image processing apparatus includes an image reader, and the desired image data is image data read by the image reader.

Preferably, the image processing apparatus includes an image reader and an image output device that outputs the image data based on the information indicating the output form, and the desired image data is one of image data read by the image reader and the image data outputted by the image output device.

To attain the above object, in a second aspect of the present invention, there is provided an image data search apparatus comprising an image data storage device that stores image data involved in each job executed by an image processing apparatus, a history information recording device that records information including at least information indicating an output form of image data in the job as history information, an image data search device that searches for image data matching desired image data from the image data stored in the image data storage device, and a history information detecting device that detects history information corresponding to the image data stored in the image data storage device, from the history information recorded in the history information recording device, wherein the image data search device changes a search method based on the information indicating the output form, which is recorded in the history information detected by the history information detecting device.

To attain the above object, in a third aspect of the present invention, there is provided an image data search method comprising an image data storage step of storing image data involved in each job executed by an image processing apparatus, a history information recording step of recording information including at least information indicating an output form of image data in the job as history information, an image data search step of searching for image data matching desired image data from the image data stored in the image data storage step, and a history information detecting step of detecting history information corresponding to the image data stored in the image data storage step, from the history information recorded in the history information recording step, wherein the image data search step changes a search method based on the information indicating the output form, which is recorded in the history information detected in the history information detecting step.

To attain the above object, in a fourth aspect of the present invention, there is provided a program for causing a computer to execute an image data search method, comprising an image data storage module that stores image data involved in each job executed by an image processing apparatus, a history information recording module that records information including at least information indicating an output form of image data in the job as history information, an image data search module that searches for image data matching desired image data from the image data stored by the image data storage module, and a history information detecting module that detects history information corresponding to the image data stored by the image data storage module, from the history information recorded by the history information recording module, wherein the image data search module changes a search method based on the information indicating the output form, which is recorded in the history information detected by the history information detecting module.

To attain the above object, in a fifth aspect of the present invention, there is provided a computer-readable storage medium storing a program causing a computer to execute an image data search method, the program comprising an image data storage module that stores image data involved in each job executed by an image processing apparatus, a history information recording module that records information including at least information indicating an output form of image data in the job as history information, an image data search module that searches for image data matching desired image data from the image data stored by the image data storage module, and a history information detecting module that detects history information corresponding to the image data stored by the image data storage module, from the history information recorded by the history information recording module, wherein the image data search module changes a search method based on the information indicating the output form, which is recorded in the history information detected by the history information detecting module.

According to the present invention, image data involved in each job executed by the image processing apparatus are stored, and information including at least information indicating an output form of image data in the job is recorded as history information. Image data that matches desired image data is searched for from the stored image data. Further, history information corresponding to the stored image data is detected from the recorded history information, and a search method for searching for the image data that matches the desired image data from the stored image data is changed based on the information indicating the output form recorded in the detected history information. Therefore, even in a case where original image data becomes different from printed image data by undergoing editing of the original image data, such as enlarged/reduced layout, layout processing for printing-bounding, or image shift, and thus being printed with an image of an original being changed, the image data that matches the desired image can be retrieved from the stored image data by changing the search method therefore, based on the information, which is recorded as the history information, indicating the output form of the image data in each job. Consequently, regardless of whether image data to be searched for is original image data or printed image data, it is possible to accurately retrieve image data that matches the original image or the printed image as a desired image from the stored image data. This can realize higher-speed and higher-accuracy search. In addition, a user can detect who performed the operation by referring to the detected history information, without performing a data inspection work of collating similar image data and a leaked document and visually confirming whether or not they match each other one by one. This can reduce load of a tracking work of a leaked document. Therefore, it is possible to easily and surely detect when, where, and how image data has been processed.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
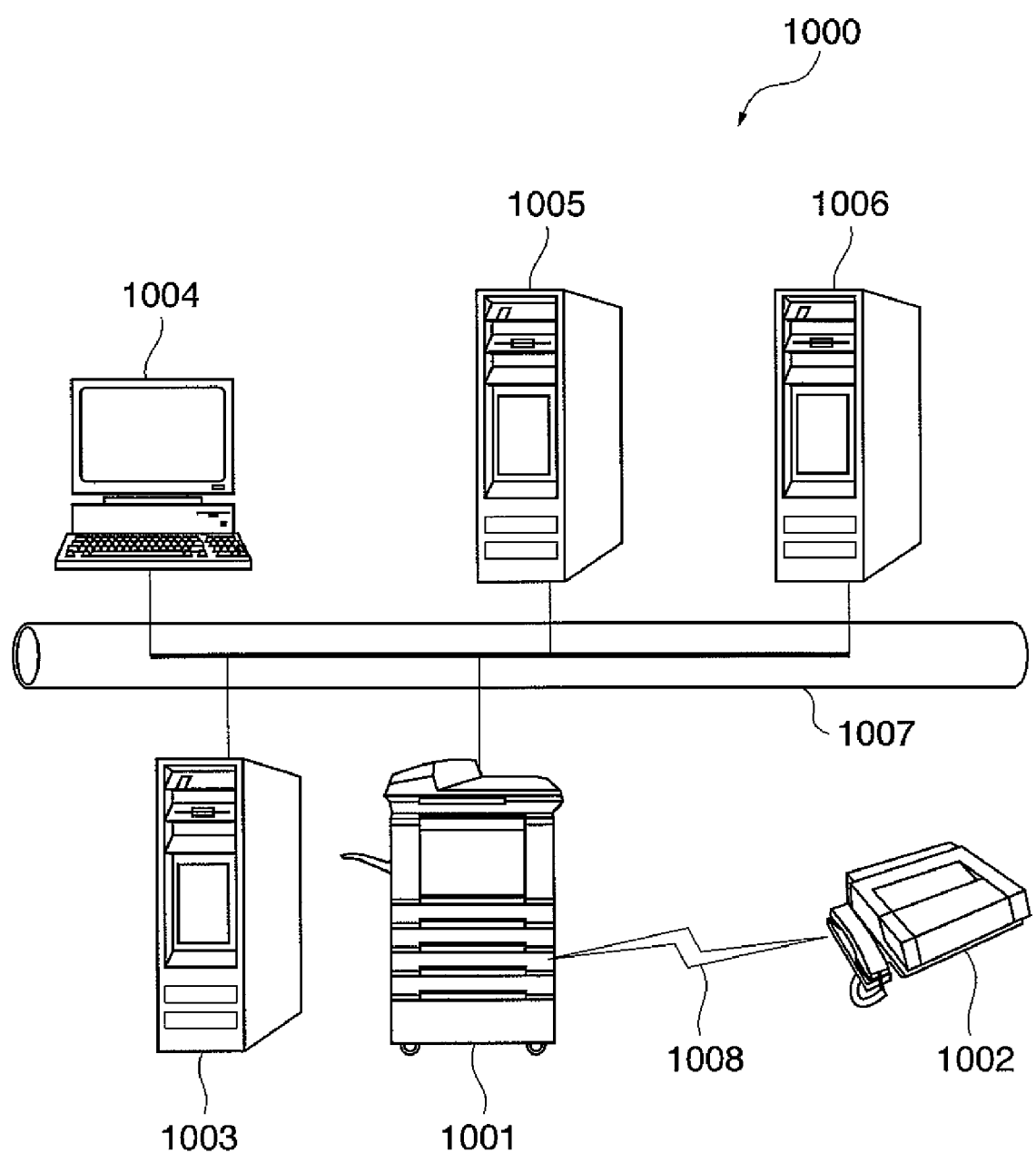
FIG. 1 is a view showing the basic system configuration of an image data search system according to an embodiment of the present invention.

FIG. 1 is a view showing the basic system configuration of an image data search system according to an embodiment of the present invention.

As shown in FIG. 1, an image data search system 1000 according to this embodiment includes a copying machine 1001 as an image processing apparatus, a facsimile 1002, a search server 1003, a client computer 1004, a storage server 1005, and a history management server 1006.

The copying machine 1001 as the image processing apparatus is a digital copying machine and is capable of printing image data on a recording sheet (paper) by scanning an original document and converting images on the original document into the image data. Further, the copying machine 1001 not only has a copy function but also has functions of a so-called digital multifunction apparatus having a printing function of printing and outputting printing data transmitted from an external host computer, a facsimile transmitting/receiving function, and so on.

The facsimile 1002 is a facsimile machine that receives data read by the copying machine 1001 via a public telephone line 1008 to print the received data.

The storage server 1005 is a memory device for monitoring that stores all image data read by the copying machine 1001.

The history management server 1006 records history information on copy jobs and transmission jobs and the like in the copying machine 1001 as a history record (history information), as will be described in FIG. 7. An image output form in a job executed by the copying machine 1001 can be changed by enlarged/reduced layout setting, finishing setting, bound layout setting, color setting, and the like. By the enlarged/reduced layout setting, the copying machine 1001 can lay out a desired number of planes (number of pages) of original images on one plane (one page) of recording sheet (this is a function called "N-in-1" or "N-up") when printing the images. By the finishing setting, it can set post-processing such as punching, stapling, and so on. By the bound layout setting, it can set the layout of printed images such as output in bound form. Further, by the color setting, it is possible to input color/monochrome information of an original image and make color/monochrome setting of a printed image. Further, in the aforesaid history record, information specifying a location in the storage server 1005 where image data corresponding to this history record is stored is recorded.

The search server 1003 searches for desired image data from the image data stored in the storage server 1005 as will be described later.

The client computer 1004 is connected to the search server 1003 and the client computer 1004 downloads image data obtained as a result of the search by the search server 1003 and the history record and displays them.

In the image data search system 1000, the copying machine 1001, the search server 1003, the client computer 1004, the storage server 1005, and the history management server 1006 are connected to the Ethernet (registered trademark) 1007, whereby a network is formed.

Incidentally, in the image data search system 1000 in FIG. 1, the search server 1003, the storage server 1005, and the history management server 1006 are separate servers, but these servers may be structured as one server satisfying the functions of the respective servers, or the function of at least one or more of these servers may be integrated in the copying machine 1001. Further, the network in the image data search system 1000 is not limited to a network based on the Ethernet (registered trademark) 1007, but may be a network based on other protocol or may be a wireless LAN.

Figure 2:
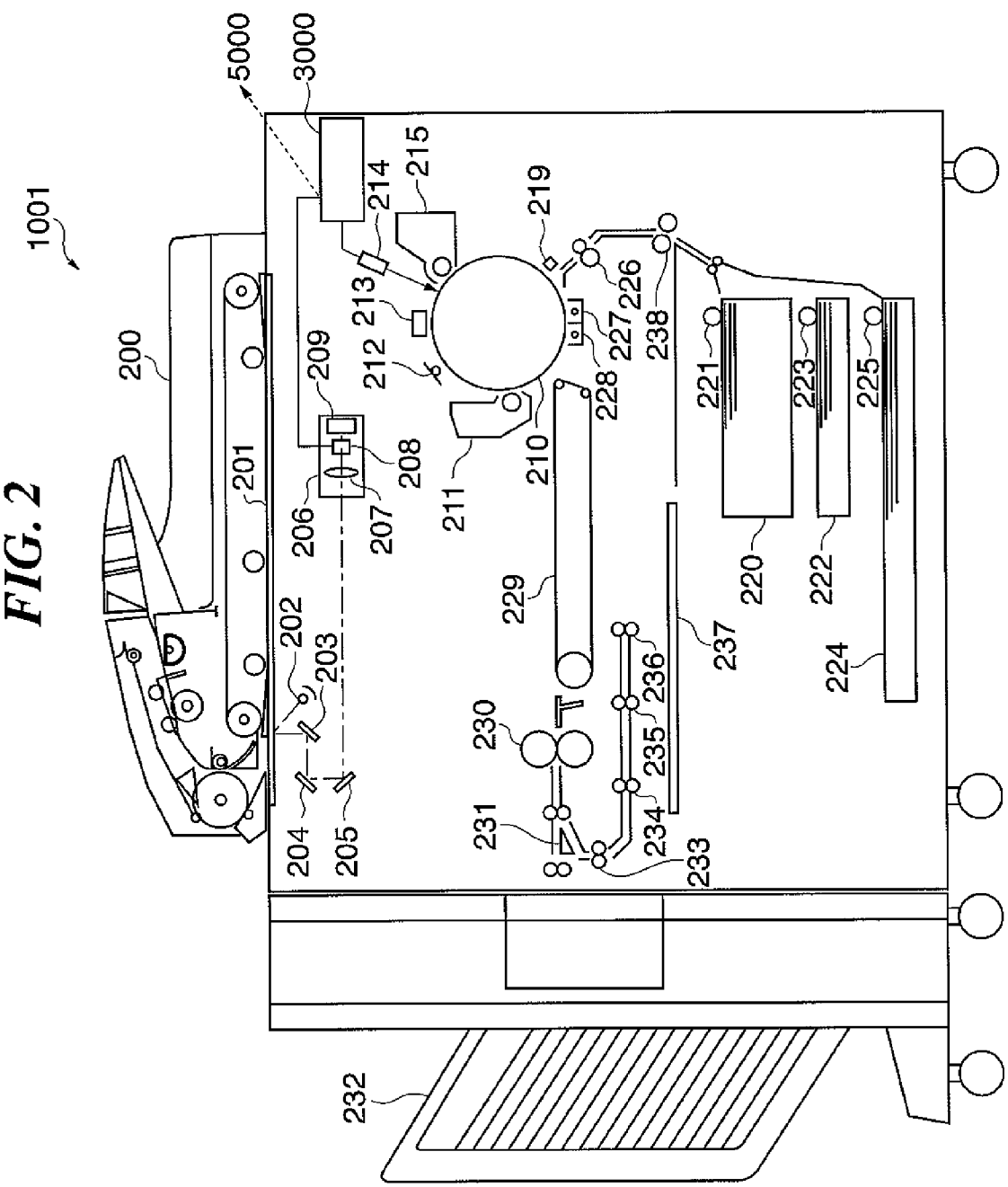
FIG. 2 is a cross-sectional view showing the schematic configuration of a copying machine in FIG. 1.

FIG. 2 is a cross-sectional view showing the schematic configuration of the copying machine 1001 in FIG. 1

In FIG. 2, reference numeral 200 denotes an automatic document feeder (hereinafter, referred to as DF) that can automatically feed a plurality of originals one by one to sequentially set each of the originals on an original platen glass 201 with a front surface or rear surface thereof facing the original platen glass 201. Being generally known, the concrete configuration of the DF 200 will not be described in detail. As shown in FIG. 2, a desired number of originals to be read by the copying machine 1001 are set on the DF 200. The originals set on the DF 200 are fed by the DF 200 one by one to be set on the original platen glass 201.

Reference numeral 202 denotes an original illuminating lamp structured by, for example, a halogen lamp and the original illuminating lamp 2002 exposes the original set on the original platen glass 201. Reference numerals 203, 204, and 205 denote scanning mirrors that are housed in a not-shown optical scanning unit to guide reflected light from the original to a CCD unit 206 while reciprocating.

The CCD unit 206 includes an image forming lens 207 forming an image of the reflected light from the original on a CCD, an image sensor 208 constituted by the CCD, a CCD driver 209 driving the image sensor 208, and so on. An image signal output from the image sensor 208 is converted to, for example, 8-bit digital data, and is then inputted to a controller unit 3000.

Further, in FIG. 2, reference numeral 210 denotes a photosensitive drum and electrostatic of the photosensitive drum 210 is eliminated by a preexposure lamp 212 in preparation for image forming. Reference numeral 213 denotes a charger that uniformly charges the photosensitive drum 210. Reference numeral 214 is an exposure unit that is constituted by, for example, a semiconductor laser or the like and exposes the photosensitive drum 210 to form an electrostatic latent image based on image data processed in the controller unit 3000 controlling image processing and the whole apparatus. Reference numeral 215 denotes a developing device that contains a black developer (toner). Reference numeral 219 is a pre-transfer charger that applies high voltage to the photosensitive drum 210 before a toner image developed on the photosensitive drum 210 is transferred to a sheet.

Reference numerals 220, 222, and 224 denote sheet feeding units, and recording sheets in the sheet feeding units 220, 222, 224 are fed into the apparatus when sheet feed rollers 221, 223, 225 are driven respectively. Each of the fed recording sheets once stops at a disposed position of a resist roller 226 and is fed again at the corresponding timing of the start of a write operation of the image formed on the photosensitive drum 210.

Reference numeral 227 denotes a transfer charger that transfers the toner image developed on the photosensitive drum 210 onto the fed recording sheet. Reference numeral 228 denotes a detach charger 228 that detaches, from the photosensitive drum 210, the recording sheet having gone through the transfer operation. Reference numeral 211 denotes a cleaner that collects the toner not transferred and remaining on the photosensitive drum 210.

Reference numeral 229 is a conveyor belt and reference numeral 230 is a fixing unit. The conveyor belt 229 conveys, to the fixing unit 230, the recording sheet that has gone through the transfer process, and the fixing unit 230 fixes a transfer image to the recording sheet by, for example, heat. Reference numeral 231 denotes a flapper that changes transport paths of the recording sheet having gone through the fixing process, either to discharge the recording sheet out of the apparatus to finish copying or to transport the recording sheet in an direction of a disposed position of an intermediate tray 237 without finishing the copying. Reference numerals 233 to 236 denote sheet feed rollers that feed the recording sheet to the intermediate tray 237 in a reverse state or in a non-reverse state after the fixing process is once finished. In a case where the recording sheet in the intermediate tray 237 is in the reverse state, multiple copying is performed, and in a case where the recording sheet is in the non-reverse state, double-sided copying is performed.

Reference numeral 238 denotes a re-feed roller that conveys the recording sheet set on the intermediate tray 237 again to the disposed position of the resist roller 236. Reference numeral 232 denotes a staple sorter that collates and staples the recording sheets to which image has been copied.

As will be described later in FIG. 3, the controller unit 3000 includes a microcomputer, an image processing part, and so on and performs the above-described image forming operation according to an instruction given via an operating section 5000 (UI).

Figure 3:
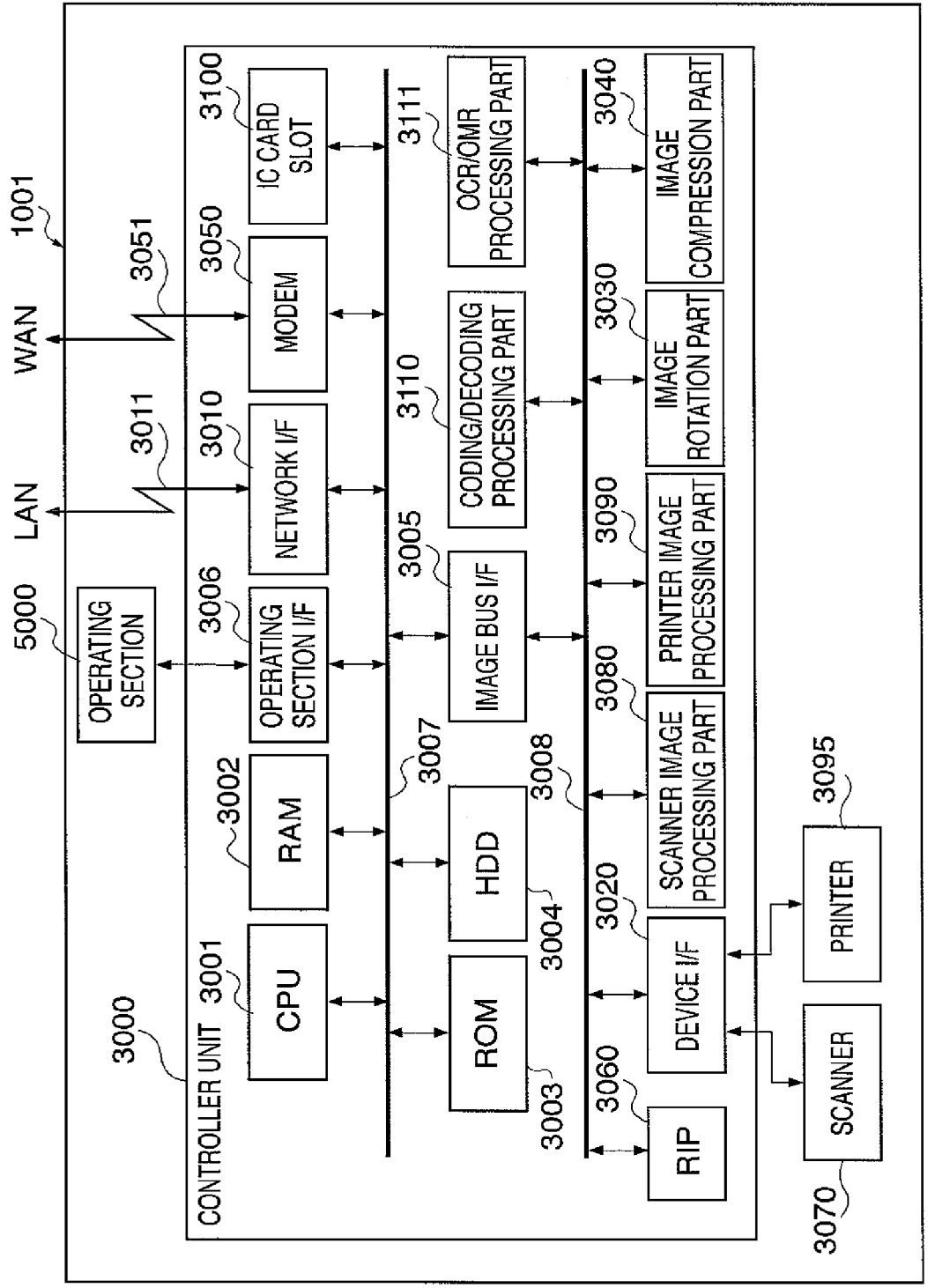
FIG. 3 is a block diagram of a system installed in the copying machine in FIG. 1.

FIG. 3 is a block diagram of a system installed in the copying machine 1001 in FIG. 1.

As shown in FIG. 3, the copying machine 1001 includes the controller unit 3000, the operating section 5000 through which a user performs various kinds of operations to the copying machine 1001, a scanner 3070 being an image input device, and a printer 3095 being an image output device. The controller unit 3000 is connected to the scanner 3070 and the printer 3095.

The controller unit 3000 is a controller that receives/outputs image data and device data from/to external apparatuses by connecting to a LAN 3011 (corresponding to the Ethernet 1007 in FIG. 1) or a public telephone line (WAN) 3051.

In the controller unit 3000, a CPU 3001 is a controller that controls all the constituent elements of the copying machine 1001. A RAM 3002 is a system work memory for the CPU 3001 to operate and is also an image memory temporarily storing image data. A ROM 3003 is a boot ROM and stores a boot program of the system. A HDD 3004 is a hard disk drive and stores system software and image data.

An operating section I/F 3006 is an interface part via which the controller unit 3000 is connected to the operating section 5000 having a touch panel and the operating section I/F 3006 outputs to the operating section 5000 an operation display data that is to be displayed on a not-shown display included in the operating section 5000. Further, the operating section I/F 3006 transmits, to the CPU 3001, information that a user of the image data search system 1000 inputs by performing a predetermined operation through the operating section 5000. A network I/F 3010 receives/outputs various kinds of information by connecting to the LAN 3011. A modem 3050 receives/outputs various kinds of information by connecting to the public telephone line 3051.

In the controller unit 3000, the above-described constituent elements are arranged on a system bus 3007. Further, an image bus I/F 3005 is disposed on the system bus 3007. The image bus I/F 3005 is a bus bridge that connects the system bus 3007 and an image bus 3008 transferring image data at a high speed and converts data structure. The image bus 3008 is constituted by a PCI bus or IEEE 1394.

On the image bus 3008, disposed are a raster image processor (RIP) 3060, a device I/F 3020, a scanner image processing part 3080, a printer image processing part 3090, an image rotation part 3030, and an image compression part 3040.

The raster image processor 3060 develops a PDL (Page Description Language) code into a bit map image. The device I/F part 3020 connects the scanner 3070 and the printer 3095, which are image input/output devices, to the controller unit 3000 to transfer image data therebetween. The scanner image processing part 3080 corrects, processes, and edits input image data. The printer image processing part 3090 performs correction of various kinds of set values of the printer 3095 according to printed output image data, conversion of the resolution of the printed output image data, and so forth. The image rotation part 3030 rotates image data. The image compression part 3040 performs compression/expansion processing of JPEG on multi-value image data and compression/expansion processing of JBIG, MMR, or MH on binary image data.

An IC card medium can be inserted in an IC card slot 3100. The IC card slot 3100 enables input/output of a key used for coding/decoding by receiving an appropriate PIN (Personal Identifier Number) code via the operating section 5000 after the IC card medium is inserted therein. A coding/decoding processing part 3110 is a hardware accelerator board that codes/decodes data by using the key stored in the IC card slot 3100. An OCR/OMR processing part 3111 performs processing for deciphering character information or two-dimensional barcode information included in image data to convert the information into a character code.

Figure 4:
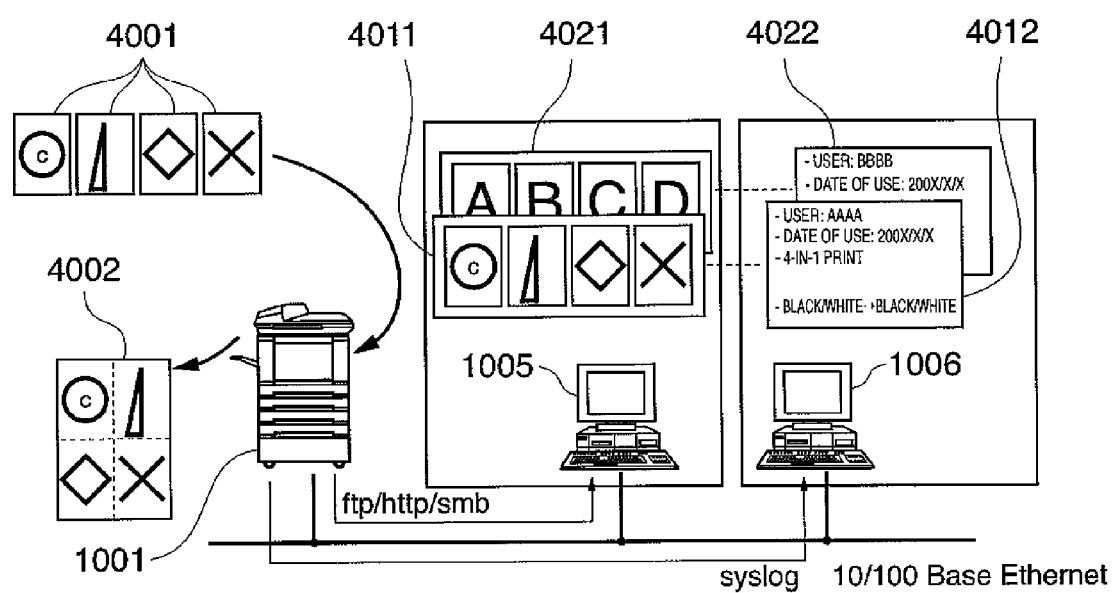
FIG. 4 is a view useful in explaining a write operation of image data to a storage server and a write operation of a history record to a history management server which are executed by the copying machine in FIG. 1.

FIG. 4 is a view useful in explaining a write operation of image data to the storage server 1005 and a write operation of a history record to the history management server 1006 which are executed by the copying machine 1001.

In FIG. 4, it is assumed that HTTP (Hyper Text Transfer Protocol), FTP (File Transfer Protocol), or SMB (Server Message Block) is utilized for storing image data in the storage server 1005 from the copying machine 1001 via the Ethernet (registered trademark) 1007. However, the protocol used for storing image data in the storage server 1005 from the copying machine 1001 via the Ethernet (registered trademark) 1007 is not limited to either of the above-mentioned protocols but may be any other existing protocol enabling data transfer. Further, in transmitting image data from the copying machine 1001 to the storage server 1005 via the Ethernet (registered trademark) 1007 or in storing image data in the storage server 1005, encryption processing may be performed on the image data when necessary.

In FIG. 4, the copying machine 1001 reads originals 4001, and it is assumed that an output form of 4-in-1 reduced layout is designated by later-described enlarged/reduced layout setting, the 4-in-1 reduced layout being layout such that reduced four pages of the originals 4001 are laid out on one page of recording sheet when they are printed.

As shown in FIG. 4, after reading the originals 4001 in a case of, for example, a copying job, the copying machine 1001 outputs an output copy 4002 as a printing result according to the above-mentioned setting. At this time, the copying machine 1001 stores all the image data 4011 of the read originals 4001 in the storage server 1005. In the storage server 1005, image data 4021 of other originals read by the copying machine 1001 are also stored as shown in FIG. 4.

Further, the copying machine 1001 writes a history record 4012 to the history management server 1006 at a timing at which the copying machine 1001 stores the image data 4011 in the storage server 1005. As will be described later in FIG. 7, examples written as the history record 4012 are user name of a user who executed the job, date of use of the copying machine 1001 by the user, information indicating the output form of the job, color setting information on the originals and printed images, job classification to be described in FIG. 6, and so on. In FIG. 4, the following pieces of information are written: "AAAA" as the user name; "200X/X/X" as the date of use; "4-in-1 printing" as the output form; and "black/white→black/white", which indicates that black-and-white originals were printed in black-and-white, as the color setting information of the originals and the printed image.

Further, as shown in FIG. 4, the history record 4012 is recorded in the history management server 1006 in association with the corresponding image data 4011. For example, information indicating a storage location of the corresponding image data 4011 in the storage server 1005 is written in the history record 4012. An example of this information is URI (Uniform Resource Identifier). Consequently, the history record 4012 is recorded in the history management server 1006 in association with the corresponding image data 4011. Further, the information associating the history record 4012 in the history management server 1006 with the image data 4011 in the storage server 1005 is not limited to the above-mentioned URI but may be information describing a path of the image data 4011. Alternatively, the mutual association can be also realized by assigning an ID unique to the relevant job to the history record 4012 and the image data 4011.

In this embodiment, in a case where a copying machine (not shown) other than the copying machine 1001 is connected to the Ethernet 1007, image data handled in jobs executed by the other copying machine are also stored in the storage server 1005. Further, history records of the jobs executed by the above other copying machine are also stored in the history management server 1006.

In this embodiment, it is assumed that syslog generally used in UNIX (registered trademark) is utilized for writing the history record from the copying machine 1001 to the history management server 1006 in FIG. 4. However, a logging protocol utilized for writing the history record from the copying machine 1001 to the history management server 1006 is not limited to syslog but other existing logging protocol may be utilized.

Although in the image data search system 1000 according to the present embodiment, the copying machine 1001, the storage server 1005, and the history management server 1006 are separately structured, it should be noted that some of them or all of them may be combined. Moreover, in the image data search system 1000 according to the present embodiment, it is assumed that protection is ensured in such a manner that only a system manager of the copying machine 1001 is allowed to set setting information necessary for accessing the storage server 1005 and the history management server 1006.

Figure 5:
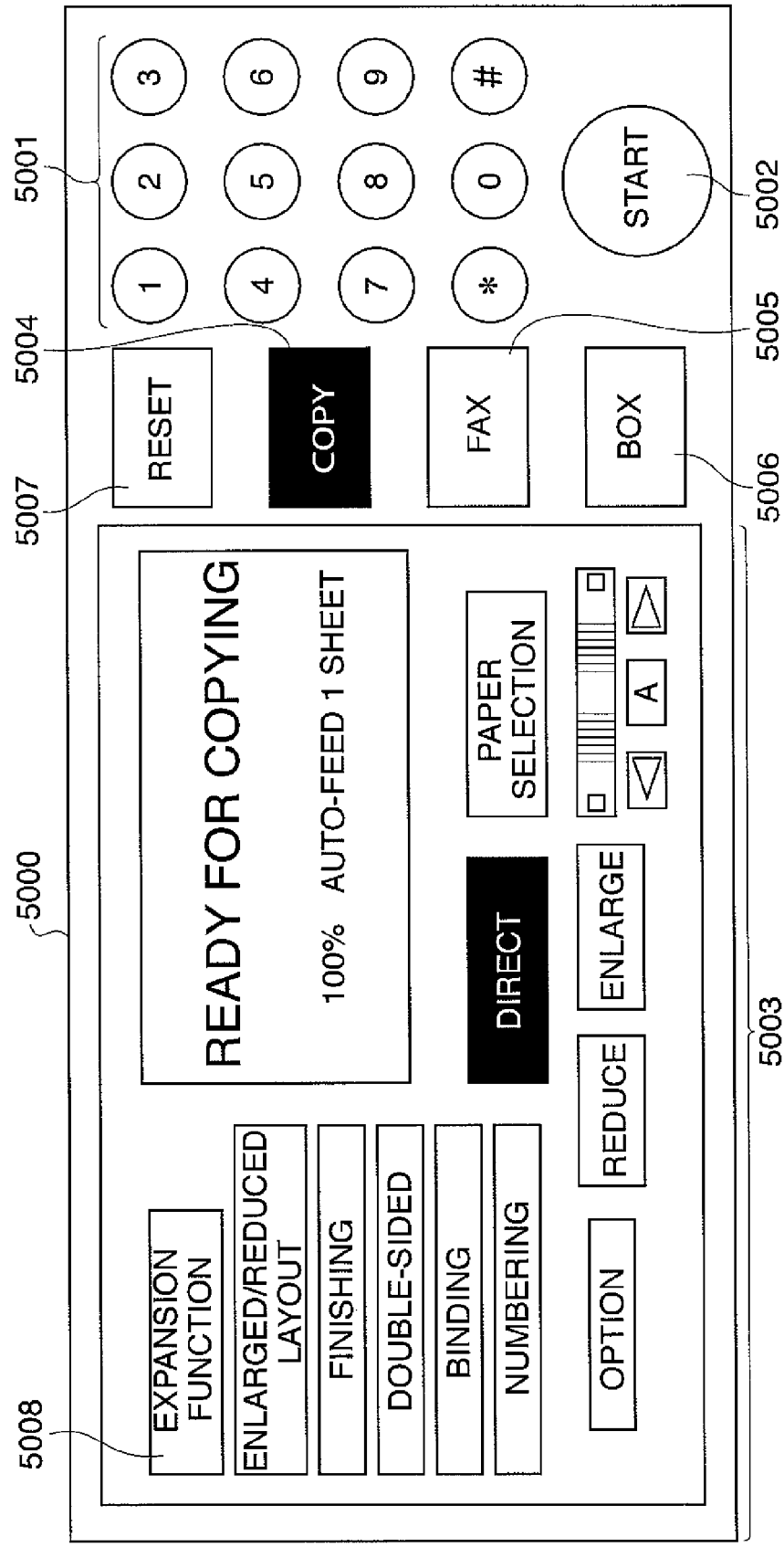
FIG. 5 is a view showing the schematic structure of an operating section of the copying machine in FIG. 3.

Next, the operating section 5000 of the copying machine 1001 will be described with reference to FIG. 5. FIG. 5 is a view showing the schematic structure of the operating section 5000.

The copying machine 1001 has a copy function, a facsimile function, and a personal box function, and the user can select a necessary function from these plural functions by performing a predetermined operation through the operating section 5000.

As shown in FIG. 5, the operating section 5000 has a ten-key 5001, a copy start key 5002, a touch panel 5003, a copy mode key 5004, a fax mode key 5005, a personal box key 5006, and a reset key 5007.

The user can set the number of copies and other necessary numerical values by operating the ten-key 5001, and can instruct copy start by pressing the copy start key 5002. The touch panel 5003 is composed of a liquid crystal display and a touch panel sheet and the touch panel 5003 displays various kinds of keys on the liquid crystal. The user can cause the copying machine 1001 to execute a desired operation by pressing the keys displayed on the touch panel 5003 with a finger.

Further, the user can select a copy mode that utilizes the copy function out of the plural functions of the copying machine 1001, by pressing the copy mode key 5004. Further, the user can select a facsimile mode that utilizes the facsimile communication function out of the plural functions, by pressing the fax mode key 5005, and can select a personal box mode that utilizes the personal box function out of the plural functions, by pressing the personal box key 5006.

The user can also reset various kinds of settings by pressing the reset key 5007. Further, the user can return an operation mode to a predetermined standard mode by pressing the reset key 5007 during a standby period.

As shown in FIG. 5, an expansion function key group 5008 is displayed on the touch panel 5003. The expansion function key group 5008 includes keys for setting various kinds of output forms of printed images printed out by copying processing of the copying machine 1001. In FIG. 5, as the expansion function key groups 5008, displayed are an enlarged/reduced layout setting key for designating how many planes of original images are to be laid out on one plane of a recording sheet at the time of printing, a finishing setting key for designating post-processing such as punching or stapling, and so on. The contents of the expansion function key group 5008 shown in FIG. 5 are only examples, and the expansion function keys are not limited to these setting keys. Description on other keys not directly involved in the present invention will be omitted.

When the user selects the copy function from the plural functions of the copying machine 1001 by pressing the copy mode key 5004 and then presses the copy start key 5002 in the operating section 5000, a reader part, not shown, of the scanner 3070 of the copying machine 1001 operates. By the operation of the reader part, an original is read and image data is generated, and this image data is transferred to the printer 3095. Then, the printer 3095 prints the transferred image data on a recording sheet to print out printed images in a set output form.

Next, image data storage/history record recording processing executed in the image data search system 1000 as configured above will be described with reference to FIG. 6.

Figure 6:
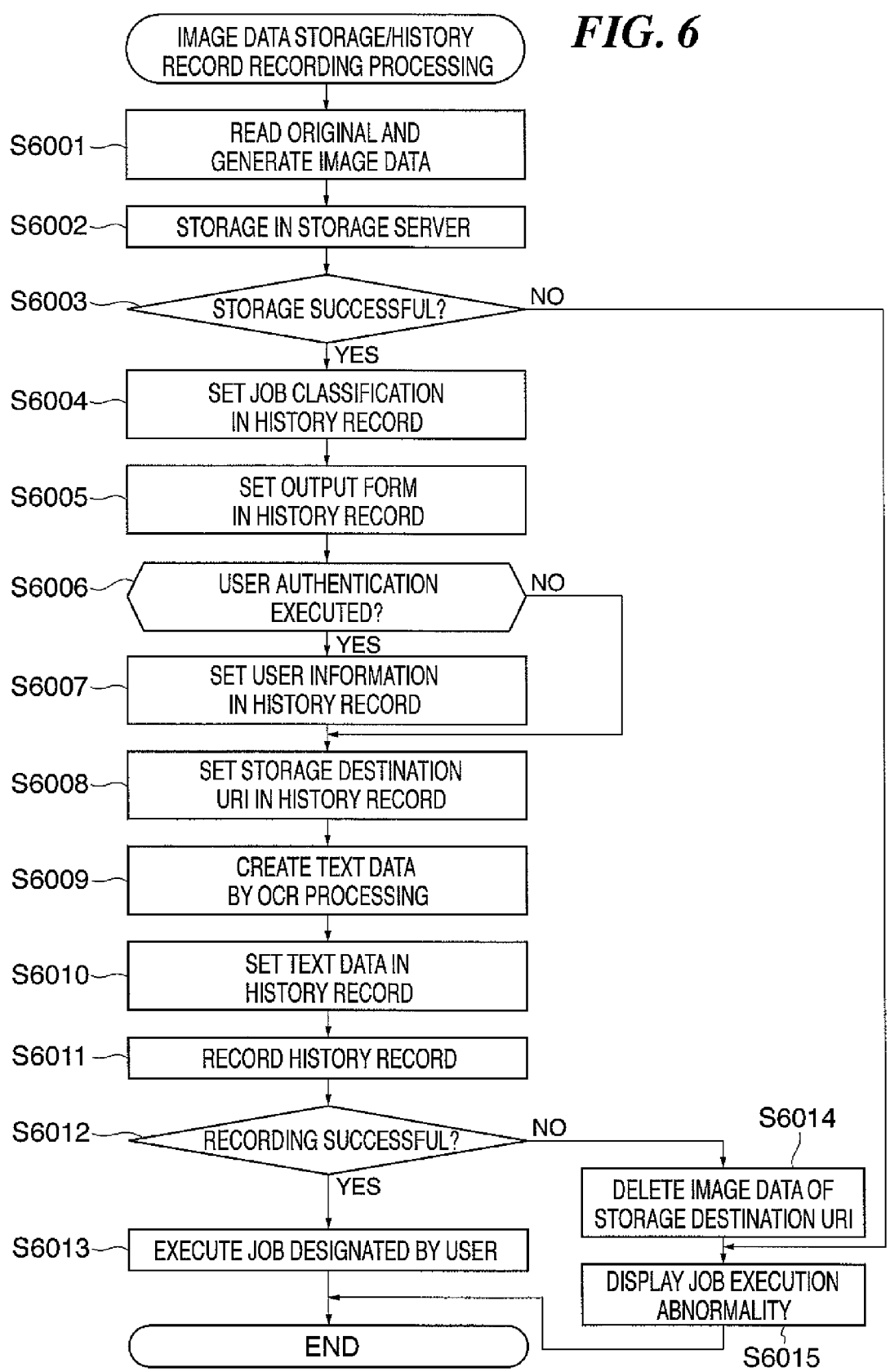
FIG. 6 is a flowchart of image data storage/history record recording processing executed by the image data search system in FIG. 1.

FIG. 6 is a flowchart of the image data storage/history record recording processing. This processing is executed by the CPU 3001 of the copying machine 1001. However, processing executed by other apparatuses is included at part of the steps.

The present processing is processing to store, in the storage server 1005, all image data of originals read in the copying machine 1001 and to record a URI (Uniform Resource Identifier) indicating a storage location of the image data in the storage server 1005, text data included in the stored image data, and so on, as a history record in the history management server 1006. Although in the present processing, the generated image data are once stored in the HDD 3004 inside the copying machine 1001 and then are transferred to the storage server 1005 at an arbitrary timing as will be described later, it should be noted that the image data may be transferred to the storage server 1005 immediately after the reading of the originals is finished or may be transferred at another arbitrary timing.

The present processing is started by the user instructing a start of job execution after the user sets originals on the DF 200 or the original platen glass 201 of the scanner 3070, selects a desired job such as copying or facsimile transmission by performing a predetermined operation through the operating section 5000, and instructs the setting of the number of copies and the finishing setting according to an intended purpose.

As shown in FIG. 6, first, the copying machine 1001 reads images of the originals by the scanner 3070 to generate image data, and then records the generated image data successively in the HDD 3004 page by page (step S6001). After the reading of the originals up to the final page is finished, the image data recorded in the HDD 3004 is transferred to the storage server 1005. Then, the storage server 1005 stores the image data transferred from the copying machine 1001 (step S6002). In storing the image data in the storage server 1005, the image data of plural pages may be either individually stored or stored after being combined to one piece of data.

When the storage processing of the image data in the storage server 1005 is finished, the copying machine 1001 determines whether or not the storage processing at the step S6002 has been a success (step S6003). In a case where the storage processing at the step S6002 has been a failure, a message to the effect that abnormality has occurred is displayed on the touch panel 5003 of the operating section 5000 (Step 56015), and then ends the present processing. Consequently, the present processing is abnormally ended. On the other hand, in a case where the storage processing at the step S6002 has been a success, the copying machine 1001 sets, in a history record, job classification information indicating job classification of the job that has been set to be executed prior to the start of the present processing (step S6004). The set history record is stored in the HDD 3004 of the copying machine 1001. In the present embodiment, the job classification information indicates function classification such as copying, facsimile, scanning, and the like.

Next, the copying machine 1001 sets output form information, which is information indicating an output form of the job to be executed, as the history record stored in the HDD 3004 at the step S6004 (step S6005). In the present embodiment, the output form means setting such as enlarged/reduced layout setting, finishing setting, bound layout setting, color setting such as black-and-white/color input setting or black-and-white/color output setting, and double-sided printing setting.

Next, the copying machine 1001 determines whether or not user authentication has been executed (step S6006). The user authentication is executed, for example, when an ID card or the like of the user is inserted in the IC card slot 3100 of the copying machine 1001 prior to the start of the present processing, by comparing user information pre-registered in the HDD 3004 and user information in the ID card to identify the user or by confirming the user from the user information in the ID card. In a case where the user authentication has been executed in the above-described manner, it is determined that the user authentication has been executed at the step S6006 and in a case where the user authentication has not been executed, it is determined that the user authentication has not been executed at the step S6006. Further, the information on the user identified and confirmed in the user authentication is recorded in the HDD 3004 or the like. It should be noted that a user authentication method is not limited to the above-described method using the IC card but may be a method of inputting the user ID and a password on the operating section 5000 or a method using biometrics authentication.

In a case where it is determined that the user authentication has been executed at the step S6006, the copying machine 1001 additionally sets the user information obtained by the user authentication, for example, information on the user name or the user ID, in the history record that has been stored in the HDD 3004 at the step S6004 (step S6007), and the processing goes to processing at a step S6008. On the other hand, in a case where it is determined that the user authentication has not been executed at the step S6006, the processing directly goes to the step S6008.

At the step S6008, the URI of the image data stored in the storage server 1005 at the step S6002 is set in the history record. Next, the text data is extracted from the image data which has been recorded in the HDD 3004 at the step S6001 by using the OCR/OMR processing part 3111 (step S6009). Then, the copying machine 1001 additionally sets the text data extracted at the step S6009 in the history record stored in the HDD 3004 at the step S6004 and step S6007 (step S6010). Then, the copying machine 1001 transfers the history record created at the steps S6004, S6005, S6007, S6008, and S6010 to the history management server 1006. The history management server 1006 records the transferred history record (step S6011).

Next, after the recording processing of the history record in the history management server 1006 is finished, it is determined whether or not the recording processing at the step S6011 has been a success (step S6012). In a case where the recording processing at the step S6011 has been a success, the job designated by the user prior to this processing is executed (step S6013), and then the present processing is finished. Consequently, the present processing is normally finished. On the other hand, in a case where the recording processing at the step S6011 has been a failure, the image data stored at the step S6002 is deleted (step S6014). Next, the processing goes to a step S6015, where a message to the effect that abnormality has occurred is displayed on the touch panel 5003 of the operating section 5000 in the same manner as described above, and the present processing is ended. Consequently, this processing is abnormally ended.

Figure 7:
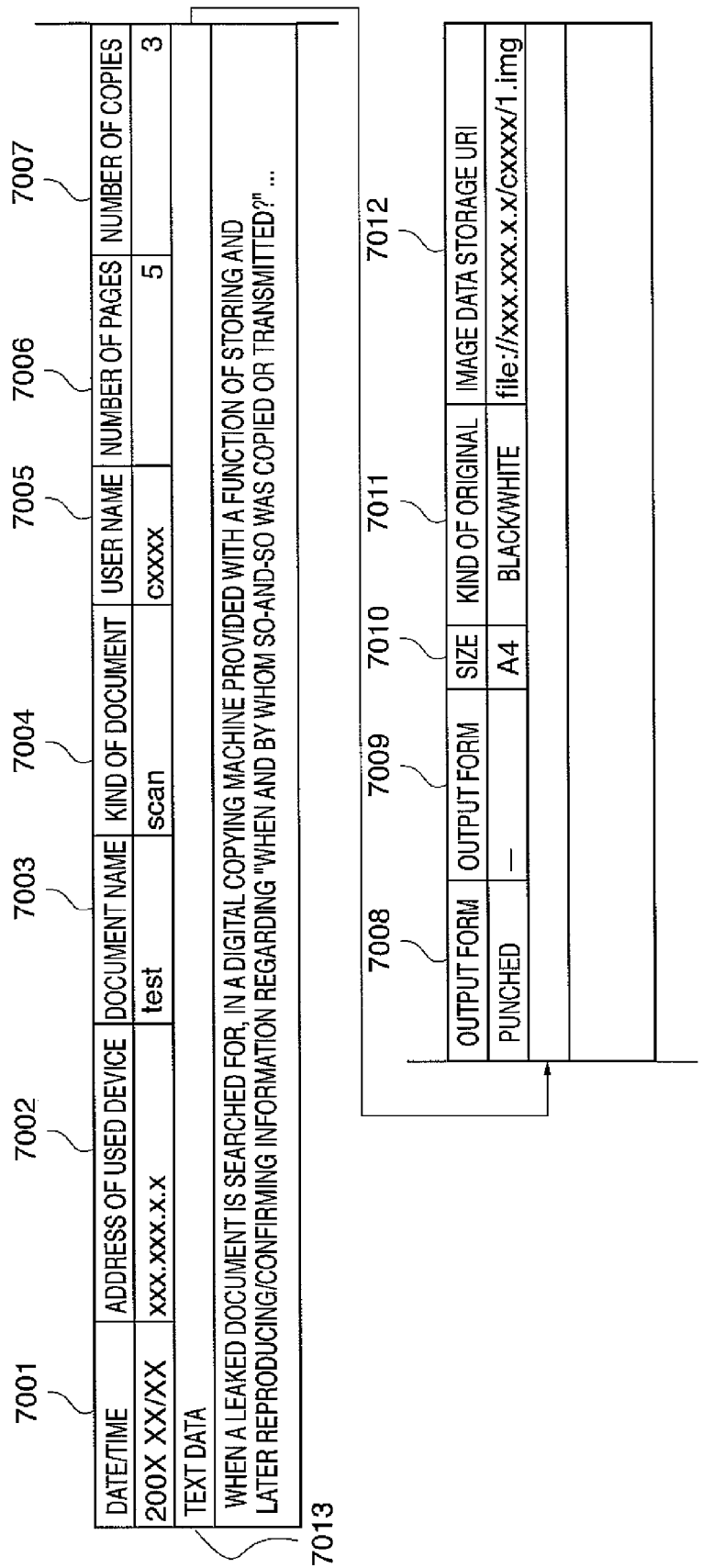
FIG. 7 is a chart showing the contents of the history record recorded in the history management server by the processing in FIG. 6.

FIG. 7 is a chart showing the contents of the history record recorded in the history management server 1006 by the processing in FIG. 6.

As shown in FIG. 7, the history record is composed of pieces of information, namely, date/time 7001, address of a used device 7002, document name 7003, kind of document 7004, user name 7005, number of pages 7006, number of copies 7007, output forms 7008, 7009, size 7010, kind of original 7011, image data storage URI 7012, and text data 7013.

The date/time 7001 shows the date/time when the history record is written. The address of a used device 7002 shows an IP address or host name of a device executing a job. The document name 7003 shows document name of image data used in the job. In the present embodiment, it is assumed that in a case of the copy mode, the document name is assigned based on a unique number automatically generated by the copying machine 1001. In a case of the fax mode, it is assumed that a receipt number is assigned as the document name. In a case of printing from the client PC, it is assumed that a file name of a printing target is assigned as the document name. In a case of the personal box mode, it is assumed that a document name assigned to a document in a personal box is used as it is. The kind of document 7004 shows function classification such as copying, facsimile, and scanning. The user name 7005 shows information enabling the identification of a user executing the job, such as a user name consisting of a character array or a user ID consisting of numerical values. The number of pages 7006 shows the number of pages of originals. The number of copies 7007 shows the number of copies to be printed at the time of the job execution. The output forms 7008, 7009 show output forms set by the enlarged/reduced layout setting, the finishing setting such as punching or stapling, and so on.

The size 7010 shows the size of printing paper. The kind of original 7011 shows the kind of original such as color/black-and-white. The image data storage URI 7012 shows a URI of stored image data. By accessing this URI, it is possible to access the image data of the read image original. The text data 7013 shows text data extracted from the read image data by using the OCR/OMR processing part 3111.

In this manner, various items are set in the history record, and a system manager can obtain various kinds of monitoring information of image data corresponding to the history record recorded in the history management server 1006 from the history record. Therefore, the items of the history record are not limited to the date/time 7001 ~ the image data storage URI 7012. For example, information indicating the classification of a job executed by the copying machine 1001 (copying, printing, facsimile transmission, or the like) and so on may be set as an item of the history record.

Figure 8:
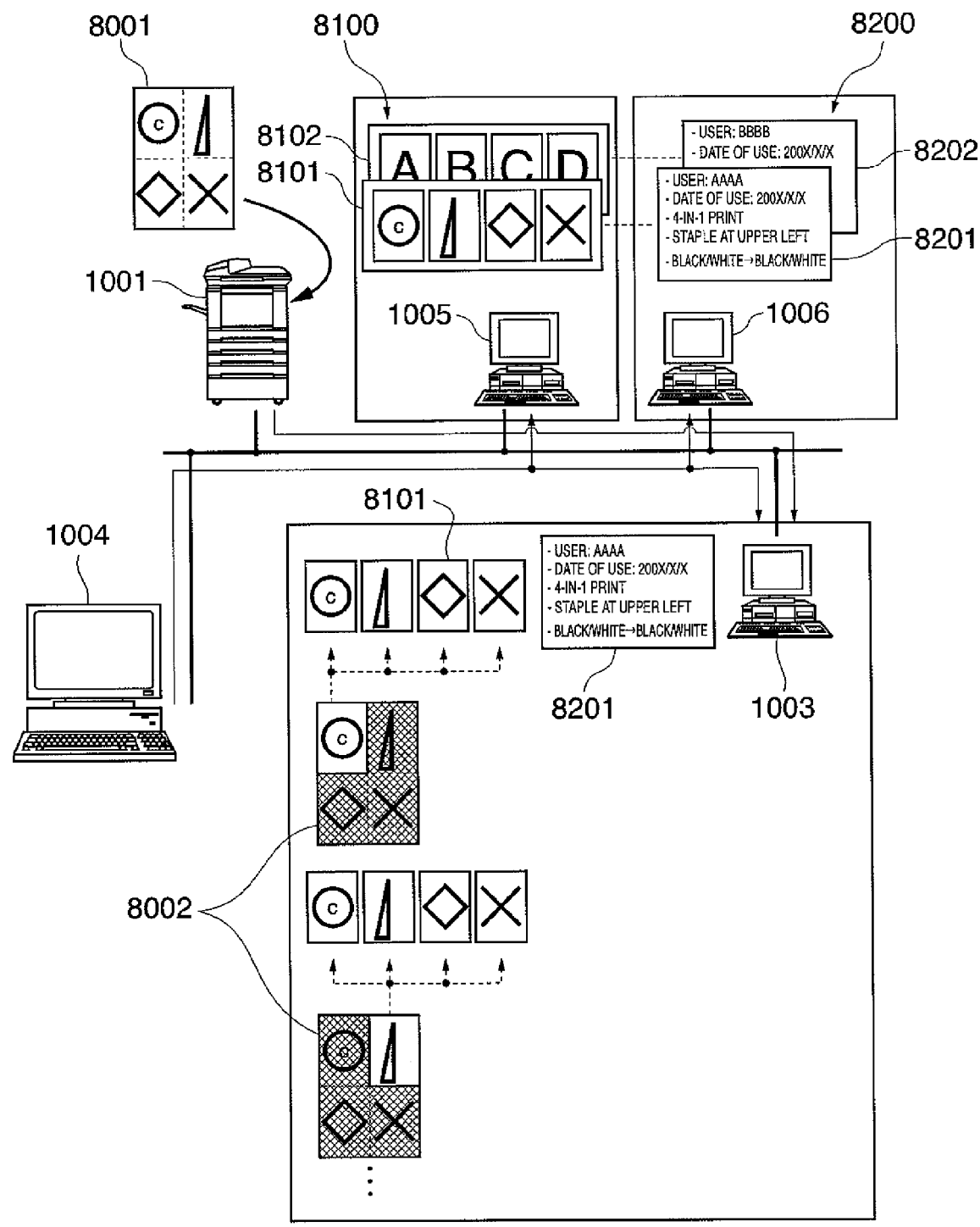
FIG. 8 is a view useful in explaining image data detection processing executed in the image data search system.

FIG. 8 is a view useful in explaining image data detection processing executed in the image data search system 1000

This processing is processing to detect search image data, which is desired image data, from the storage server 1005 by utilizing the search server 1003.

As shown in FIG. 8, first, a user with manager authority accesses the search server 1003 via the client computer 1004.

Next, a desired image about which the user wants to know when, where, how, and by whom it was processed by using the copying machine 1001, for example, a leaked document 8001 containing leaked information, is read by using the scanner 3070 of the copying machine 1001. Here, it is assumed that the copying machine 1001 has a function of transmitting the read image to the search server 1003 to instruct the search, and this function is executed by a predetermined operation to the operating section 5000 of the copying machine 1001. Then, search image data 8002 which is image data of the read document is generated and the generated search image data 8002 is recorded in the HDD 3004 page by page. Next, the copying machine 1001 transmits the generated search image data 8002 to the search server 1003. Incidentally, the copying machine 1001 executes the above-described functions by activating a special function called "chasing mode" for tracking a leaked document, based on an instruction from the operating section 5000 by the user with manager authority.

The search server 1003 performs processing for detecting image data that matches the search image data 8002 received from the copying machine 1001, by searching the storage server 1005 and comparing the search image data 8002 and image data 8100 which are stored in the storage server 1005 by the aforesaid processing in FIG. 6. In this detection processing, generally-known pattern matching technique or layout matching technique is used for detecting the image data that matches the search image data 8002.

In this detection processing, the search server 1003 searches the history management server 1006 to obtain history record 8200 corresponding to the image data 8100 and changes a method of a detection process of the matching image data according to the output form information written in the obtained history records 8200.

Concretely, as shown in FIG. 8, from the information written in a history record 8201 corresponding to image data 8101, it is known that the image data 8101 is image data of four-page originals printed according to an instruction of "4-in-1" (form in which four original images are enlarged or reduced and then outputted in 2×2 arrangement) which is one of the output forms of the enlarged/reduced layout. Therefore, in the pattern matching processing between the search image data 8002 transmitted from the copying machine 1001 and the image data 8101 stored in the storage server 1005, image data compared with the image data 8101 are extracted from image areas of respective image data in the search image data 8002 in a state not yet converted to the 4-in-1 output form.

Concretely, the search image data 8002 is recognized as image data resulting from the conversion to the 4-in-1 output form that is the same output form as that designated for the image data 8101, and the search image data 8002 is divided into four areas so that the four areas respectively show areas of the original image data in a state before the respective image data have been laid out in the 4-in-1 output form. Then, images of the respective areas resulting from the division are extracted (areas not hatched in the search image data 8002 in FIG. 8). Then, the detection process is sequentially performed, that is, image data which matches each image data extracted from the search image data 8002 is sequentially detected from the respective original image data of the image data 8101.

In a case where it is found by this detection process that the respective image data extracted from the search image data 8002 match the respective original image data of the image data 8101, this means that the search image data 8002 being the image data of the leaked document 8001 and the image data 8101 match each other. The above-described processing is sequentially performed on each image data (image data 8101, 8102) in the image data 8100 stored in the storage server 1005.

In FIG. 8, the image data 8101 and the search image data 8002 transmitted from the copying machine 1001 match each other in this detection processing. In this case, the image data 8101 matching the search image data 8002 and the history record 8201 corresponding to the image data 8101 are downloaded from the search server 1003 to the client computer 1004. In this manner, desired image data is retrieved in the image data search system 1000.

Consequently, from the retrieved image data matching the desired search image data and the information in the history record corresponding to the retrieved image data, the user with manager authority can easily and surely find when, where, how, and by whom the search image data was processed by using the copying machine 1001.

Incidentally, in a case where a leaked document is not a copy like the leaked document 8001 with changed layout from originals but is a copy with unchanged layout, image data thereof is used as it is in the detection processing.

It should be noted that in the embodiment of the present invention, the detection processing is not limited to that based on the pattern matching processing and the layout matching processing, but various generally-known image recognition techniques are usable.

Next, another example of the image data search system 1000 according to the present embodiment will be described.

In this example, original image data read by the copying machine 1001 are not stored in the storage server 1005, but printed image data that match output images printed out by the copying machine 1001 after the layout has been changed are stored in the storage server 1005. The user can change the layout of the original data by designating processing in the copying machine 1001 such as enlarged/reduced layout, printing-binding, and image shift on the original image data.

Figure 9:
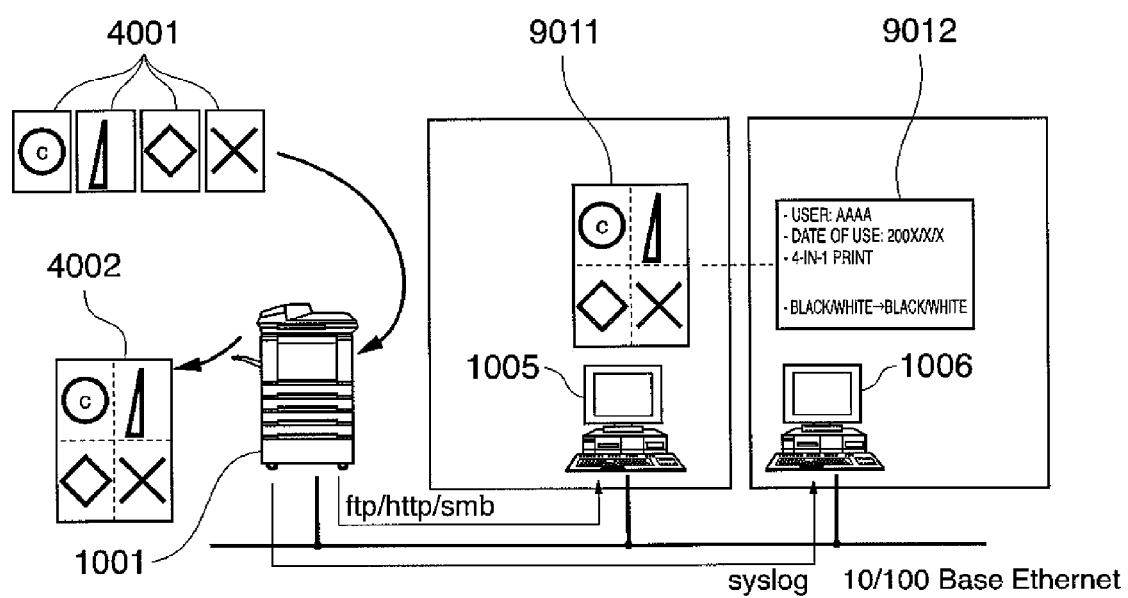
FIG. 9 is a view useful in explaining another example of the write operation of image data to the storage server and the write operation of a history record to the history management server which are executed by the copying machine in FIG. 1.

FIG. 9 is a view useful in explaining another example of the write operation of image data to the storage server 1005 and the write operation of a history record to the history management server 1006 which are executed by the copying machine 1001.

In FIG. 9, it is assumed that HTTP (Hyper Text Transfer Protocol), FTP (File Transfer Protocol), or SMB (Server Message Block) is used for storing image data in the storage server 1005 from the copying machine 1001 via the Ethernet (registered trademark) 1007, as in the first embodiment described above. However, the protocol used for storing image data in the storage server 1005 from the copying machine 1001 via the Ethernet (registered trademark) 1007 is not limited to the abovementioned protocols but any other existing protocol enabling data transfer may be used. Moreover, in the storage of image data in the storage server 1005 from the copying machine 1001 via the Ethernet (registered trademark) 1007, encryption processing may be performed on the image data when necessary.

In FIG. 9, it is assumed that originals 4001 are read by the copying machine 1001, and an output form of 4-in-1 reduced layout such that four pages of the originals 4001 are laid out on one page of recording sheet when they are printed is designated by the enlarged/reduced layout setting.

As shown in FIG. 9, after reading the originals 4001, the copying machine 1001 outputs an output copy 4002 as a printing result according to the above setting. At this time, the copying machine 1001 generates image data 9011 in which the reduced originals 4001 are laid out in the 4-in-1 output form, and stores the image data 9011 in the storage server 1005.

Further, the copying machine 1001 writes a history record 9012 to the history management server 1006 at the same timing when the image data 9011 is stored in the storage server 1005. Examples written as the history record 9012 are user name of the user who executed the job, date of use of the copying machine 1001 by the user, information indicating the output form in the job, color setting information on the originals and the printed image, job classification, and so on. In FIG. 9, the following pieces of information are written: "AAAA" as the user name; "200X/X/X" as the date of use; "4-in-1 printing" as the output form; and "white/black→white/black", which indicates that the white-and-black originals are printed in white-and-black, as the color setting information of the originals and the printed image.

Further, as shown in FIG. 9, the history record 9012 is recorded in the history management server 1006 in association with the corresponding image data 9011, and the history record 9012 contains, for example, information indicating the location of the corresponding image data in the storage server 1005.

It is assumed that syslog is used for the writing of the history record from the copying machine 1001 to the history management server 1006 in FIG. 9, as in the first embodiment described above. However, the protocol used for the writing of the history record from the copying machine 1001 to the history management server 1006 is not limited to syslog, but other existing logging protocol may be used.

Although the copying machine 1001, the storage server 1005, and the history management server 1006 are separately structured in the image data search system 1000, it should be noted that some of them or all of them may be integrated also in this example. Moreover, in the image data search system 1000, protection is ensured in such a manner that only a system manager of the copying machine 1001 is allowed to set the setting information necessary for accessing the storage server 1005 and the history management server 1006.

Figure 10:
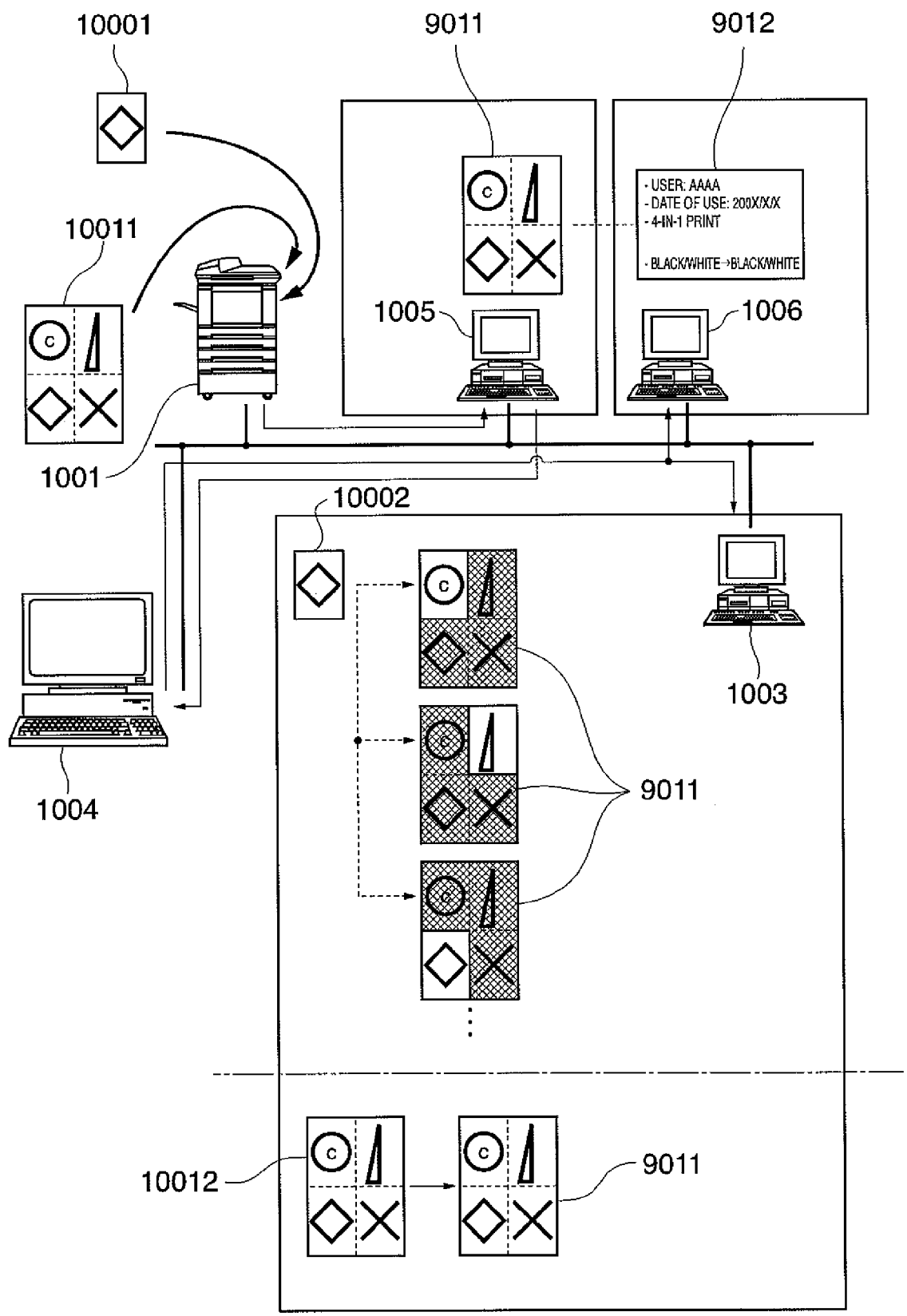
FIG. 10 is a view useful in explaining another example of the image data detection processing executed in the image data search system.

FIG. 10 is a view useful in explaining another example of the image data detection processing executed in the image data search system 1000.

The present processing is processing to detect search image data being desired image data from the storage server 1005 by utilizing the search server 1003.

As shown in FIG. 10, first, a user with manager authority accesses the search server 1003 from the client computer 1004.

Next, a desired image about which the user wants to know when, where, how, and by whom it is processed by using the copying machine 1001, for example, a leaked document 10001 containing leaked information is read by using the scanner 3070 of the copying machine 1001. Then, search image data 10002 being image data of the read original is generated and recorded in the HDD 3004. In a case where plural pages of the search image data 10002 exist, the generated search image data 1002 is recorded page by page in the HDD 3004 successively.

Next, the copying machine 1001 transmits the generated search image data 10002 to the search server 1003. Here, information indicating that the image of the image data transmitted from the copying machine 1001 to the search server 1003 is an image having undergone no layout change may be transmitted by a user's operation. The search server 1003 performs processing for detecting image data that matches the search image data 10002 received from the copying machine 1001, by searching the storage server 1005 and comparing the search image data 10002 and image data 9011 stored in the storage server 1005 by the aforesaid operation in FIG. 9. In this detection processing, image data that matches the search image data 10002 is detected by pattern matching processing.

In this detection processing, the search server 1003 searches the history management server 1006 to obtain history records 9012 corresponding to the image data 9011 and changes the pattern matching processing of the image data according to the output form information written in the obtained history records 9012.

Concretely, as shown in FIG. 10, from the written information in the history record 9012 corresponding to the image data 9011, it is known that the search image data 10002 is printed image data matching a printed image that has been printed out as a result of the execution of printing in the 4-in-1 output form. Therefore, in the pattern matching processing of the search image data 10002 transmitted from the copying machine 1001 and the image data 9011 stored in the storage server 1005, in a reverse manner from the manner of FIG. 8 described above, image data compared with the search image data 10002 are extracted from areas of images in a state before the image data 9011 has been converted to image data in the 4-in-1 output form.

Concretely, the image data 9011 is divided into four areas so that the four areas respectively show areas of the original image data before the conversion to the 4-in-1 output form written in the history record 9012, that is, before the layout change. Then, images in the respective areas resulting from the division are extracted (areas not hatched in the image data 9011 in FIG. 10). Then, the pattern matching of each of the image data extracted from the image data 9011 and the search image data 10002 is sequentially performed.

In a case where it is found by this pattern matching that one of the image data extracted from the image data 9011 matches the search image data 10002, this means that the search image data 10002 being the image data of the leaked document 10001 and the original image data of the image data 9011 match each other.

In FIG. 10, in this pattern matching processing, one of the original image data before the layout change, which corresponds to the image data 9011 stored in the storage server 1005 matches the search image data 10002 sent from the copying machine 1001. In this case, the image data 9011 matching the search image data 10002 and the history record 9012 corresponding to the image data 9011 are downloaded from the search server 1003 to the client computer 1004. In this manner, desired image data is retrieved in the image search system 1000.

Consequently, even in a case where the desired search image data is data that has been printed out with a changed layout in the copying machine 1001 and printed image data that match output images after the layout change are stored in the storage server 1005, the user can easily and surely find out when, where, how, and by whom the desired search image data has been processed by using the copying machine 1001, from the retrieved image data whose original image data before the layout change matches the desired search image data and from the information in the history record corresponding to the retrieved image data.

Further, in a case where a desired image that the user wants to search for is printed image data after the layout change like a leaked document 10011 as shown in FIG. 10, the leaked document 10011 is read by using the scanner 3070 of the copying machine 1001, as in the above-described case. Then, search image data 10012 being image data of the read document 10011 is generated, and the generated search image data 10012 is transmitted to the search server 1003.

The image data 9011 stored in the storage server 1005 are image data after the layout change, and therefore, the pattern matching processing is performed while the image data 10012 and the image data 9011 are kept as they are. Here, when the copying machine 1001 reads the leaked document 10011 to transmit the resultant image data to the search server 1003, information indicating that the layout has been changed (for example, 4-in-1) may be added by an operation of the manager user. Then, on condition that the contents of the layout change indicated by this added information and the information indicating the output form in the history record match each other (for example, the both indicate "4-in-1"), it is determined that the pattern matching processing of the image data 10012 and the image data 9011 may be performed without any consideration of the output form.

In this pattern matching processing, the image data 9011 stored in the storage server 1005 and the search image data 10012 transmitted from the copying machine 1001 match each other. In this case, the image data 9011 matching the search image data 10012 and the history record 9012 corresponding to this image data 9011 are downloaded from the search server 1003 to the client computer 1004. In this manner, in the image data search system, desired image data is retrieved.

Consequently, even in a case where desired search image data is data that has been printed out with the changed layout in the copying machine 1001 and printed image data matching output images after the layout change are stored in the storage server 1005, the user can easily and surely find when, where, how, and by whom the desired search image data has been processed by using the copying machine 1001, from the retrieved image data matching the desired search image data and the information in the history record corresponding to this image data.

It should be noted that the pattern matching processing is not limited to that described above, also in this example, and various kinds of known matching processing are usable.

As described above, according to the image search system 1000 of the embodiment of the present invention, an original image is read by the copying machine 1001, and original image data or printed image data whose layout is changed by the copying machine 1001 is generated as used image data. Then, the generated image data is stored in the storage server 1005. Further, a history record is generated by recording history information of the job, such as information indicating a storage location of the used image data in the storage server 1005, user name of a user who executed the job, date of use of the copying machine 1001 by the user, information indicating the output form in the job, color setting information on the original and the printed image, and information on job classification, and this history record is recorded in the history management server 1006.

Then, after a desired image about which the user wants to know when, where, how, and by whom it was processed by using the copying machine 1001 is read by using the copying machine 1001, search image data being image data of this image is generated and transmitted to the search server 1003. The search server 1003 searches the storage server 1005 to detect image data matching the search image data from the stored used image data by the pattern matching. At this time, the search server 1003 searches the history management server 1006 to detect, from the recorded history records, history records corresponding to the used image data in the storage server 1005 that are to be compared with the search image data in the pattern matching, and changes areas for extraction in the pattern matching according to the information indicating the output form recorded in the detected history record.

Therefore, even in a case where original image data and printed image data are different since an original is printed with a changed image layout by processing such as enlarged/reduced layout, printing-binding, and image shift, even in a case where the original image data are stored as used image data in the storage server 1005 and search image data is the printed image data after the layout change, or even in a case where the printed image data after the layout change are stored as the used image data in the storage server 1005 and the search image data is the original image data before the layout change, image data matching the search image data is detected from the used image data by changing areas for extraction in the pattern matching according to the information indicating the output form recorded in the history record.

Consequently, it is possible to correctly detect the used image data matching the original image data or printed image data as the search image data, irrespective of whether the used image data are the original image data before the layout change or the printed image data after the layout change, whereby it is possible to realize higher search speed and improved search accuracy.

In addition, the user can detect who performed the operation by referring to the detected history record, without performing a data inspection work of visually confirming whether similar image data and a leaked document match each other one by one by collating the both, whereby it is possible to reduce load of a tracking work of the leaked document. Therefore, under various monitoring conditions, it is possible to easily and surely detect when, where, and how the used image data has been processed.

Although only the single storage server 1005 and the single history management server 1006 are provided in the image data search system according to the present embodiment, a plurality of the storage servers and the history management servers may be provided in the image data search system.

Further, in the present embodiment, the copying machine 1001 being a digital copying machine is described as an example of an image processing apparatus, but the image processing apparatus may be a single function printer. In this case, printed data is converted to image data based on user information, the printed data, and information designating the output form of the printed data which are received from an external host computer, followed by output processing based on the designated output form. Then, a history record is generated based on the information received from the host computer to be written to the history management server 1006, and image data having gone through the output processing based on the designated output form is written to the storage server 1005.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and the storage medium on which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided in an expansion board inserted into a computer or in an expansion unit connected to the computer and then causing a CPU or the like provided in the expansion board or the expansion unit to perform a part or all of the actual operations based on instructions of the program code.

This application claims the benefit of Japanese Patent Application No. 2005-204874 filed Jul. 13, 2005, which is hereby incorporated by reference herein by its entirety.

What is claimed is:

1. An image data search system having an image processing apparatus comprising:
    an image data storage unit that stores image data involved in a job executed by the image processing apparatus;
    a history information recording unit that records information including at least information indicating an output form of image data in the job as history information, in association with the image data stored by said image data storage unit;
    an image data search unit that searches for image data matching desired image data from the image data stored by said image data storage unit; and
    a history information detecting unit that detects history information corresponding to the image data stored by said image data storage unit, from the history information recorded by said history information recording unit,
    wherein said image data search unit changes based on information indicating the output form, which is recorded in the history information detected by said history information detecting unit, a search method for searching the image data stored by said image data storage unit in association with the history information including the information indicating the output form.

2. An image data search system according to claim 1, wherein said image data search unit performs the search by changing areas of the image data stored by said image data storage unit, based on the information indicating the output form, which is recorded in the history information detected by said history information detecting unit.

3. An image data search system according to claim 1, wherein said image data search unit performs the search by changing areas of the desired image data, based on the information indicating the output form, which is recorded in the history information detected by said history information detecting unit.

4. An image data search system according to claim 1, wherein the information indicating the output form is setting information of said image processing apparatus and includes at least one of enlargement or reduction setting information, finishing setting information, layout setting information, original color information, and printing color setting information.

5. An image data search system according to claim 1, further comprising an authentication unit that authenticates a user operating said image processing apparatus, and
    wherein said history information recording unit records, as the history information, information on a user who instructs the execution of the job of said image processing apparatus, based on a result of the authentication by said authentication unit.

6. An image data search system according to claim 1, wherein said image processing apparatus includes an image reading unit, and the image data is image data of an original read by said image reading unit.

7. An image data search system according to claim 1,
    wherein said image processing apparatus includes an image reading unit and an image processing unit that processes the image data based on the information indicating the output form, and
    wherein the image data is one of image data of an original read by said image reading unit and the image data of the original processed by said image processing unit.

8. An image data search system according to claim 1, wherein said image processing apparatus includes an image reading unit, and the desired image data is image data read by said image reading unit.

9. An image data search system according to claim 1,
wherein said image processing apparatus includes an image reading unit and an image processing unit that processes the image data based on the information indicating the output form, and
wherein the desired image data is one of image data read by said image reading unit and the image data processed by said image processing unit.

10. An image data search apparatus comprising:
an image data storage unit that stores image data involved in a job executed by an image processing apparatus;
a history information recording unit that records information including at least information indicating an output form of image data in the job as history information, in association with the image data stored by said image data storage unit;
an image data search unit that searches for image data matching desired image data from the image data stored by said image data storage unit; and
a history information detecting unit that detects history information corresponding to the image data stored by said image data storage unit, from the history information recorded by said history information recording unit,
wherein said image data search unit changes, based on the information indicating the output form, which is recorded in the history information detected by said history information detecting unit, a search method for searching the image data stored by said image data storage unit in association with the history information including the information indicating the output form.

11. An image data search method comprising:
an image data storage step of storing image data involved in a job executed by an image processing apparatus;
a history information recording step of recording information including at least information indicating an output form of image data in the job as history information, in association with the image data stored in said image data storage step;
an image data search step of searching for image data matching desired image data from the image data stored in said image data storage step; and
a history information detecting step of detecting history information corresponding to the image data stored in said image data storage step, from the history information recorded in said history information recording step,
wherein said image data search step changes, based on the information indicating the output form, which is recorded in the history information detected in said history information detecting step, a search method for searching the image data stored in said image data storage step in association with the history information including the information indicating the output form.

12. A computer-readable storage medium storing a program causing a computer to execute an image data search method, the program comprising:
an image data storage module that stores image data involved in a job executed by an image processing apparatus;
a history information recording module that records information including at least information indicating an output form of image data in the job as history information, in association with the image data stored by said image data storage module;
an image data search module that searches for image data matching desired image data from the image data stored by said image data storage module; and
a history information detecting module that detects history information corresponding to the image data stored by said image data storage module, from the history information recorded by said history information recording module,
wherein said image data search module changes, based on the information indicating the output form, which is recorded in the history information detected by said history information detecting module, a search method for searching the image data stored by said image data storage module in association with the history information including the information indicating the output form.

* * * * *